United States Patent
Lee

(10) Patent No.: US 12,280,630 B1
(45) Date of Patent: Apr. 22, 2025

(54) SUSPENSION FOR VEHICLE AND VEHICLE INCLUDING SAME

(71) Applicants: Hyundai Motor Company, Seoul (KR); Kia Corporation, Seoul (KR)

(72) Inventor: Hyun Jae Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/883,091

(22) Filed: Sep. 12, 2024

(30) Foreign Application Priority Data

Dec. 13, 2023 (KR) .................. 10-2023-0181266

(51) Int. Cl.
*B60G 11/12* (2006.01)
*B60G 7/00* (2006.01)

(52) U.S. Cl.
CPC .............. *B60G 7/006* (2013.01); *B60G 11/12* (2013.01); *B60G 2200/21* (2013.01); *B60G 2202/114* (2013.01); *B60G 2204/416* (2013.01); *B60G 2204/422* (2013.01)

(58) Field of Classification Search
CPC .... B60G 11/12; B60G 7/006; B60G 2200/21; B60G 2202/114; B60G 2204/416; B60G 2204/422; B60G 9/025; B60G 11/08; B60G 11/04; B60G 11/10
See application file for complete search history.

(56) References Cited

U.S. PATENT DOCUMENTS

| 5,562,348 | A | * | 10/1996 | Link | F16C 33/6677 |
| | | | | | 384/474 |
| 5,566,969 | A | | 10/1996 | Tattermusch | |
| 5,897,107 | A | * | 4/1999 | Zierden | F16C 35/067 |
| | | | | | 29/898.07 |
| 8,936,265 | B2 | | 1/2015 | Ehrlich et al. | |
| 11,731,474 | B2 | * | 8/2023 | Schiwiora | B60G 11/113 |
| | | | | | 280/124.174 |
| 11,938,769 | B2 | * | 3/2024 | Song | B60B 35/02 |
| 2019/0351961 | A1 | * | 11/2019 | Zhang | B62D 65/024 |
| 2023/0150325 | A1 | * | 5/2023 | Zhang | B60G 11/02 |
| | | | | | 280/5.514 |

FOREIGN PATENT DOCUMENTS

| CN | 112124059 B | 3/2022 |
| JP | 3489320 B2 | 1/2004 |
| JP | 2005119363 A | 5/2005 |
| JP | 2005280613 A | 10/2005 |

* cited by examiner

*Primary Examiner* — Paul N Dickson
*Assistant Examiner* — Matthew Joseph Ganci
(74) *Attorney, Agent, or Firm* — Slater Matsil, LLP

(57) ABSTRACT

A suspension for a vehicle includes an arm part including a first arm end revolvable about an arm rotation axis, a transverse leaf spring unit including a fixed leaf end, of which a relative position to the arm rotation axis is fixed, and a free leaf end movable in a direction crossing the arm rotation axis with respect to the fixed leaf end, and a link connecting the arm part and the transverse leaf spring unit, wherein the first arm end is rotatable about a first rotation axis with respect to a first link end, the free leaf end is rotatable about a second rotation axis with respect to a second link end opposite the first link end, and a direction in which either the first or second rotation axis extends varies to be parallel to or cross a direction in which the other extends.

20 Claims, 10 Drawing Sheets

SUSPENSION FOR VEHICLE AND VEHICLE INCLUDING SAME

CROSS-REFERENCE TO RELATED APPLICATIONS

This application claims the benefit of Korean Patent Application No. 10-2023-0181266, filed on Dec. 13, 2023, which application is hereby incorporated herein by reference.

TECHNICAL FIELD

The present disclosure relates to a suspension for a vehicle and a vehicle including the same.

BACKGROUND

A suspension applied to a vehicle is installed between a vehicle body and wheels to absorb vibrations generated while the vehicle is driven, and it may prevent vibrations from being transmitted to a driver through the vehicle body.

In general, the suspension may be provided with an arm that connects the vehicle body and wheels, a shock absorber, and the like. An impact absorbing device may include a spring and a shock absorber. The spring provided in the impact absorbing device is mainly provided as a coil spring that is installed in an upward/downward direction.

When the spring provided in the suspension of the vehicle is a coil spring, an upper end of the coil spring is installed to support a lower portion of the vehicle body. On the other hand, when the upper end of the coil spring is installed to support a lower portion of the vehicle body, the height of the floor of the vehicle body cannot be designed to be lowered below a certain height due to an upward/downward width of the coil spring itself.

SUMMARY

Embodiments of the present disclosure can solve problems occurring in the prior art while advantages achieved by the prior art are maintained intact.

Embodiments of the present disclosure provide a suspension for a vehicle that has a structure that allows a height of a floor of the vehicle body to be lowered without being limited by springs.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a suspension for a vehicle includes an arm part including a first arm end that is revolved about an arm rotation axis, a transverse leaf spring unit including a fixed leaf end, of which a relative position to the arm rotation axis is fixed, and a free leaf end that is moved in a direction crossing the arm rotation axis with respect to the fixed leaf end, and a link connecting the arm part and the transverse leaf spring unit. The first arm end is rotated about a first rotation axis with respect to a first link end being one end of the link, the free leaf end is rotated about a second rotation axis with respect to a second link end being an opposite end of the link, and a direction, in which any one of the first rotation axis and the second rotation axis extends, varies to be parallel to or cross a direction, in which the other one extends.

Furthermore, the first link end may be disposed on an upper side of the free leaf end.

Furthermore, the first link end may be disposed on an upper side of the second link end.

Furthermore, when a direction, in which the fixed leaf end faces the free leaf end in a leftward/rightward direction being parallel to the arm rotation axis, is a first leftward/rightward direction, the first link end may be disposed on a side of the second link end in the first leftward/rightward direction when the suspension is viewed from a rear side of the suspension in parallel to a forward/rearward direction.

Furthermore, the suspension may further include a fixed frame fixed to the first arm end to be revolved together with the first arm end and a first shaft inserted to pass through the first link end to be fixed to the fixed frame and defining the first rotation axis, and the first link end may be connected to the fixed frame to be rotatable about the first rotation axis.

Furthermore, the suspension may further include a first ball joint assembly connecting the fixed frame and the first link end and through which the first shaft passes, and the first ball joint assembly may include a first ball joint, to which the first shaft is fixed, and a first bushing that is rotatable about a first joint rotation center being a rotation center corresponding to a center of the first ball joint and connected to the first link end.

Furthermore, the suspension may further include a second shaft inserted to pass through the second link end to be fixed to the free leaf end and defining the second rotation axis, and the second link end may be connected to the free leaf end to be rotatable about the second rotation axis.

Furthermore, the suspension may further include a second ball joint assembly connecting the free leaf end and the second link end and through which the second shaft passes, and the second ball joint assembly may include a second ball joint, to which the second shaft is fixed, and a second bushing that is rotated about a second joint rotation center being a rotation center corresponding to a center of the second ball joint and connected to the second link end.

Furthermore, the link may include a link body extending between the first link end and the second link end, and the link may be positioned in any one of a unloaden state, in which the link body passes through the arm rotation axis extending in a leftward/rightward direction and crosses a reference plane being perpendicular to an upward/downward direction, a rebound state, in which the link body is located to be spaced downward apart from the reference plane to be most distant therefrom, and a bump state, in which the link body is located to be spaced upward apart from the reference plane to be most distant therefrom.

Furthermore, the link may be positioned in the rebound state when the first arm end is revolved about the arm rotation axis toward a front side and a lower side from the unloaden state, and it is oriented to be inclined with respect to the upward/downward direction such that an upper portion of the link body is located on a rear side of a lower portion thereof when the link is in the rebound state.

Furthermore, the link may be positioned in the bump state when the first arm end is revolved about the arm rotation axis toward the front side and an upper side from the unloaden state, and it is oriented to be inclined with respect to the upward/downward direction such that the upper portion of the link body is located on a front side of the lower portion thereof when the link is in the bump state.

Furthermore, when the link is switched from any one of the unloaden state, the rebound state, and the bump state to another one thereof, a direction, in which the second rotation axis extends, may be formed to be parallel to a specific direction, and a direction, in which the first rotation axis extends, may vary to be parallel to or cross the second rotation axis.

Furthermore, the transverse leaf spring unit further may include a transverse leaf spring extending between the fixed leaf end and the free leaf end, an elastic force may be applied to the transverse leaf spring through revolution of the first arm end, and the free leaf end may be moved with respect to the fixed leaf end by the elastic force applied to the transverse leaf spring.

Furthermore, an upper end of the fixed leaf end may be disposed on an upper side of the free leaf end.

Furthermore, the first link end may be disposed on a lower side of the second link end.

Furthermore, the first link end may be disposed on a lower side of the free leaf end.

Furthermore, an upper end of the free leaf end may be disposed on an upper side of the fixed leaf end.

According to an embodiment of the present disclosure, a vehicle includes a vehicle body and a suspension for the vehicle mounted on a lower side of the vehicle body. The suspension for the vehicle may include an arm part including a first arm end that is revolved about an arm rotation axis, a transverse leaf spring unit including a fixed leaf end fixed to a lower portion of a vehicle frame and a free leaf end that is moved in a direction crossing the arm rotation axis with respect to the fixed leaf end, and a link connecting the arm part and the transverse leaf spring unit. The first arm end is rotated about a first rotation axis with respect to a first link end being one end of the link, the free leaf end is rotated about a second rotation axis with respect to a second link end being an opposite end of the link, and a direction, in which any one of the first rotation axis and the second rotation axis extends, varies to be parallel to or cross a direction, in which the other one extends.

Furthermore, the suspension for the vehicle may be provided on each of one side and an opposite side of the vehicle in a widthwise direction to have a shape being symmetrical with respect to a vehicle reference plane passing through a center of the vehicle and being perpendicular to the widthwise direction of the vehicle.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
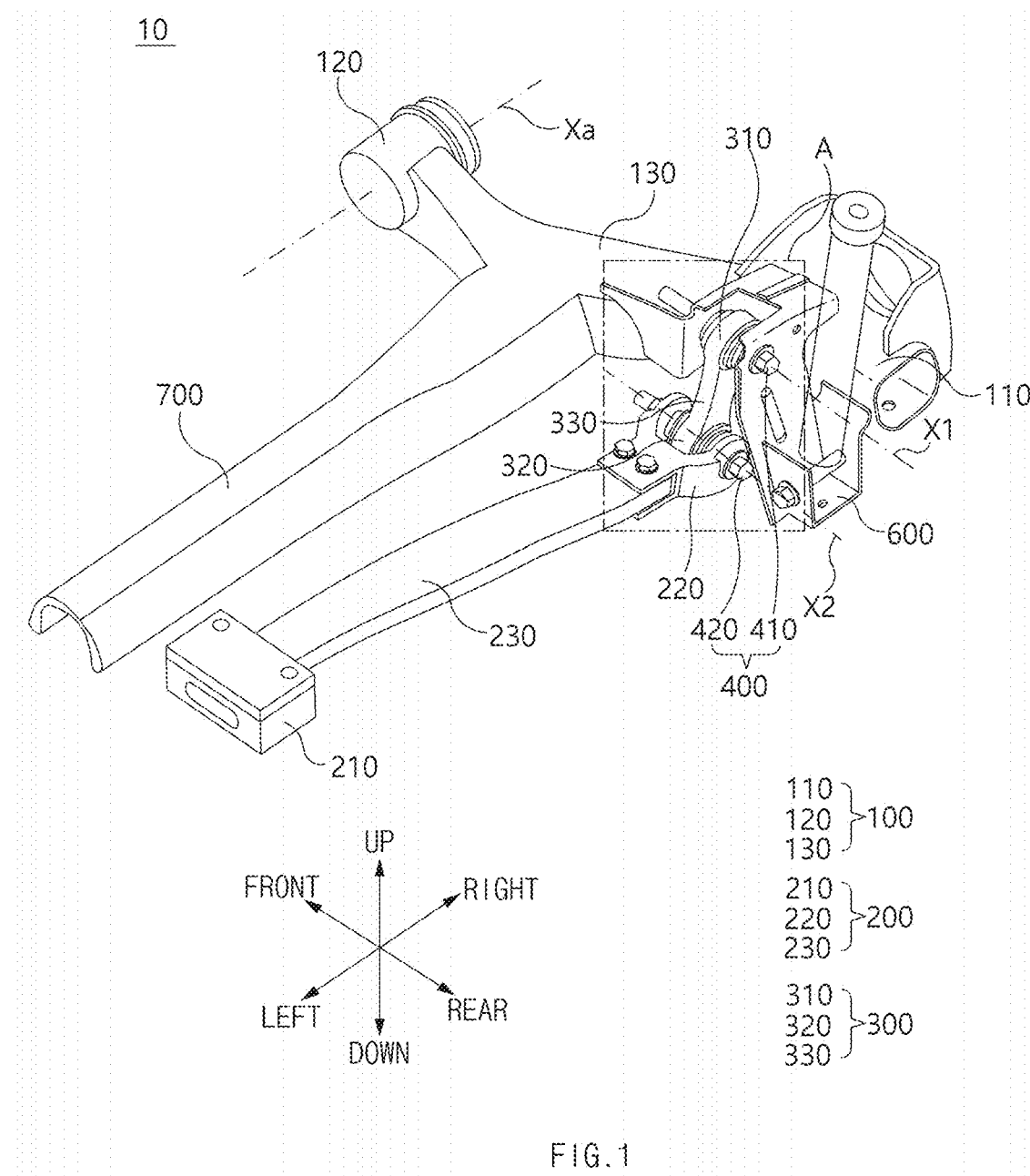
FIG. 1 is a perspective view of a suspension for a vehicle according to a first embodiment of the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Hereinafter, a vehicle according to embodiments of the present disclosure will be described with reference to the drawings.

As an example, a vehicle according to embodiments of the present disclosure may include a purpose built vehicle (PBV). An interior space of the vehicle may be utilized in various ways. As an example, the vehicle may be used as a rest area for a user, a mobile warehouse, or a mobility for delivering goods. Such a vehicle may include a suspension for a vehicle, a vehicle body (not illustrated), and an axle (not illustrated).

First Embodiment

Figure 2:
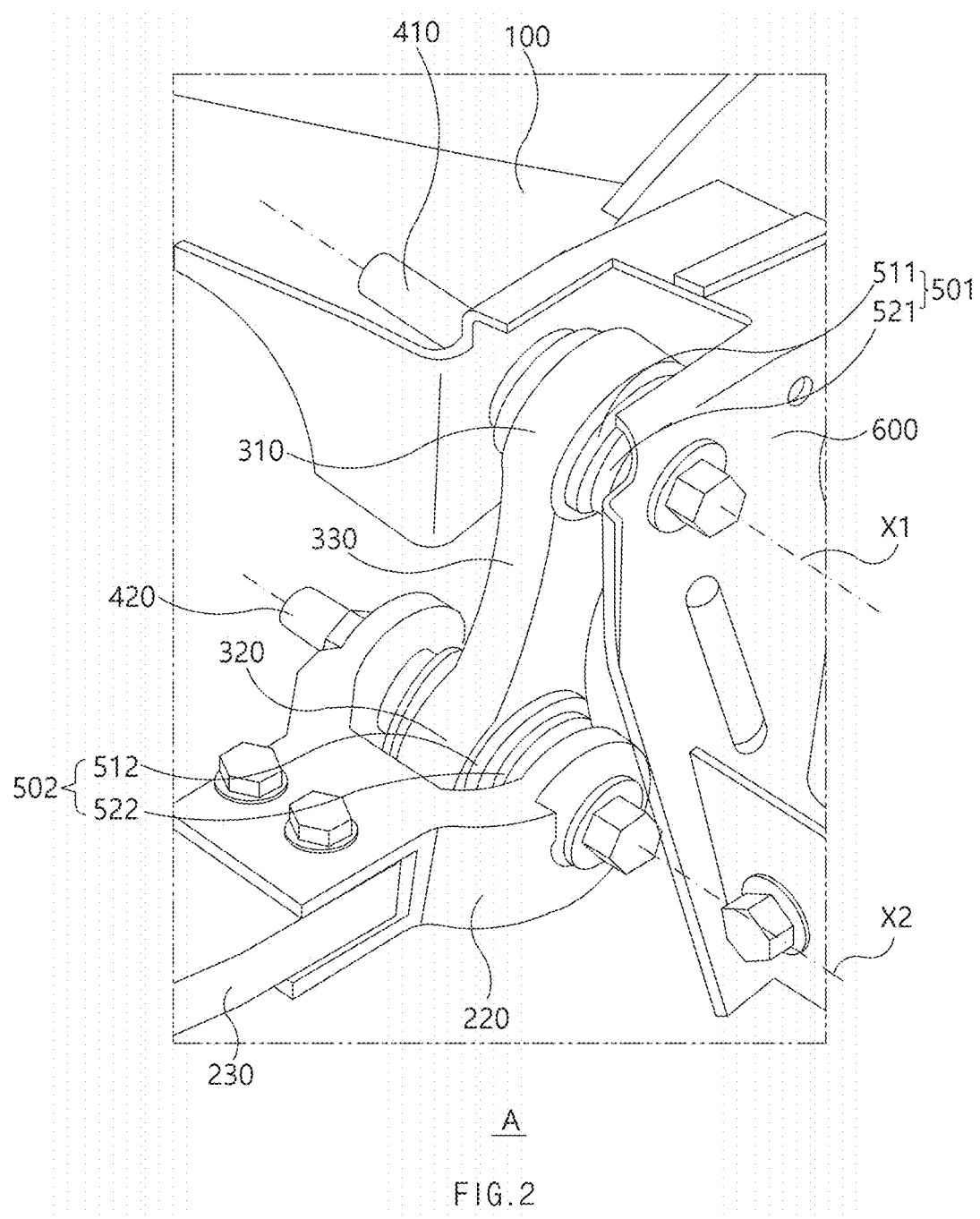
FIG. 2 is an enlarged view of portion "A" illustrated in FIG. 1.

FIG. 1 is a perspective view of a suspension for a vehicle according to a first embodiment of the present disclosure, and FIG. 2 is an enlarged view of portion "A" illustrated in FIG. 1.

Referring to FIGS. 1 and 2, a suspension 10 for a vehicle according to the first embodiment of the present disclosure may perform an impact absorbing operation on front wheels or rear wheels of the vehicle. For example, the suspension 10 may perform an impact absorbing operation on the rear wheels of the vehicle. Some portions of the suspension 10 may be connected to a lower portion of the vehicle body, and other portions may be connected to the rear wheels of the vehicle. The suspension 10 may include an arm part 100, a transverse leaf spring unit 200, a link 300, a shaft 400, a first ball joint assembly 501, a second ball joint assembly 502, a fixed frame 600, and a torsion beam 700.

The arm part 100 may connect a vehicle body and an axle. The axle may mean an area on which the wheels of the vehicle are mounted. As an example, the arm part 100 may be provided as a trailing arm, a semi-trailing arm, and the like. The arm parts 100 are provided on left and right sides of the vehicle, respectively, and may be disposed to be symmetrical to each other. The arm parts 100 may include a first arm end 110, a second arm end 120, and an arm body 130.

The first arm end 110 may be revolved about an arm rotation axis Xa. The arm rotation axis Xa may be defined as an imaginary line that passes through a center of the second arm end 120 and extends in a leftward/rightward direction. The expression that the first arm end 110 is revolved about the arm rotation axis Xa may mean that a center of the first arm end 110 is revolved around the rotation axis Xa while the center of the first arm end 110 is spaced apart from the arm rotation axis Xa. The first arm end 110 may define a rear end of the arm part 100.

The second arm end 120 may define the arm rotation axis Xa. The second arm end 120 may be connected to the vehicle body to be rotatable. The second arm end 120 may define a front end of the arm part 100.

The arm body 130 may extend between the first arm end 110 and the second arm end 120. As an example, the arm body 130, the first arm end 110, and the second arm end 120 may be integrally formed.

The transverse leaf spring unit 200 may absorb vibration between the vehicle body and the axle. The transverse leaf spring unit 200 may be elastically bent in correspondence to a movement of the axle in the upward/downward direction with respect to the vehicle body. The transverse leaf spring units 200 may be provided on the left side and the right side of the vehicle, respectively, and may be disposed symmetrically to each other. The transverse leaf spring unit 200 may include a fixed leaf end 210, a free leaf end 220, and a transverse leaf spring 230.

The fixed leaf end 210 may be fixed to a lower portion of the vehicle body. A relative position of the fixed leaf end 210 to the arm rotation axis Xa may be fixed. The fixed leaf end 210 may connect the transverse leaf spring 230 and the vehicle body.

The fixed leaf ends 210 and the free leaf ends 220 may be spaced apart from each other in the leftward/rightward directions. Furthermore, among the directions that are parallel to the leftward/rightward direction, a direction in which the fixed leaf end 210 faces the free leaf end 220 may be defined as a first leftward/rightward direction, and an opposite direction to the first leftward/rightward direction may be defined as the second direction. For example, with respect to the transverse leaf spring unit 200 provided on the right side of the vehicle, the first leftward/rightward direction may be a rightward direction, and the second leftward/rightward direction may be a leftward direction.

An upper end of the fixed leaf end 210 may be disposed on an upper side of the free leaf end 220. In this way, because the free leaf end 220 is located on a lower side of the upper end of the fixed leaf end 210, the vehicle may be designed such that the use of space around the axle may be maximized, and at the same time, a height of the floor of the vehicle body may be lowered to a location around the upper end of the fixed leaf end 210.

The free leaf end 220 may be configured to be moved in a direction (e.g., the upward/downward direction) that crosses the arm rotation axis Xa with respect to the fixed leaf end 210. The free leaf end 220 may connect the transverse leaf spring 230 and the link 300.

The transverse leaf spring 230 may extend between the fixed leaf end 210 and the free leaf end 220. The transverse leaf spring 230 may be an elastic member that has a plate shape that extends in the leftward/rightward direction.

The transverse leaf spring 230 may receive an elastic force through revolution of the first arm end 110. The free leaf end 220 may be moved in the upward/downward direction with respect to the fixed leaf end 210 by the elastic force applied to the transverse leaf spring 230.

The free leaf end 220 may be connected to a side of the transverse leaf spring 230 in the first leftward/rightward direction. Furthermore, the fixed leaf end 210 may be connected to a side of the transverse leaf spring 230 in the second leftward/rightward direction.

Referring back to FIG. 2, the link 300 may connect the arm part 100 and the transverse leaf spring unit 200. In more detail, the link 300 may connect the fixed frame 600 and the free leaf end 220. The link 300 may be connected to the arm part 100 to be rotatable. For example, the link 300 may be directly connected to the arm part 100, or it may be indirectly connected to the arm part 100 by another component (e.g., a damper, a carrier, a fixed frame 600, and the like).

A center of the link 300 may be disposed on an upper side of the free leaf end 220. The link 300 may include a first link end 310, a second link end 320, and a link body 330.

The first link end 310 may define one end of the link 300. The first link end 310 may be rotated with respect to the first arm end 110. The first link end 310 may be connected to the fixed frame 600 to be rotatable about a first rotation axis X1. The first rotation axis X1 may be defined by a first shaft 410 that will be described later.

The first link end 310 may be disposed on an upper side of the second link end 320. Furthermore, the first link end 310 may be disposed on an upper side of the free leaf end 220.

The second link end 320 may define an opposite end of the link 300. The second link end 320 may be rotated with respect to the free leaf end 220. The second link end 320 may be connected to the free leaf end 220 to be rotatable about a second rotation axis X2. The second rotation axis X2 may be defined by a second shaft 420 that will be described later.

A direction in which any one of the first rotation axis X1 and the second rotation axis X2 extends may vary to be parallel to or cross a direction in which the other rotation axis extends. For example, the second rotation axis X2 may extend along a forward/rearward direction. Furthermore, a relative position of the second rotation axis X2 to the arm rotation axis Xa may be fixed.

In this case, a relative position of the first rotation axis X1 to the second rotation axis X2 and the arm rotation axis Xa may be changed. For example, the first rotation axis X1 extends in a direction that is parallel to the forward/rearward direction, or it may extend in a direction to cross the forward/rearward direction to cross the second rotation axis X2. In other words, the second rotation axis X2 may be a non-variable rotation axis that extends in one predetermined direction, and the first rotation axis X1 may be a variable rotation axis, of which a direction oriented depending on an operation of the arm part 100 is changed.

The link body 330 may connect the first link end 310 and the second link end 320. The link body 330 may extend between the first link end 310 and the second link end 320 along a direction in which the first link end 310 and the second link end 320 face each other. As an example, the link body 330 may be integrally formed with the first link end 310 and the second link end 320.

Meanwhile, the arm part, the transverse leaf spring unit, and the link according to a modification of the first embodiment of the present disclosure may be configured differently from the arm part 100, the transverse leaf spring unit 200, and the link 300 according to the first embodiment.

The first link end according to the modification of the first embodiment may be disposed on a lower side of the second link end. For example, the second link end according to the modification of the first embodiment may be disposed on a lower side of the free leaf end. Accordingly, an upper end of the free leaf end may be disposed on an upper side of the fixed leaf end.

In summary, the arm part, the transverse leaf spring unit, the first link end, and the second link end according to the modification of the first embodiment may be configured to corresponding to shapes that are obtained by vertically reversing the arm part 100, the transverse leaf spring unit 200, the first link end 310, and the second link end 320 according to the first embodiment.

Figure 4:
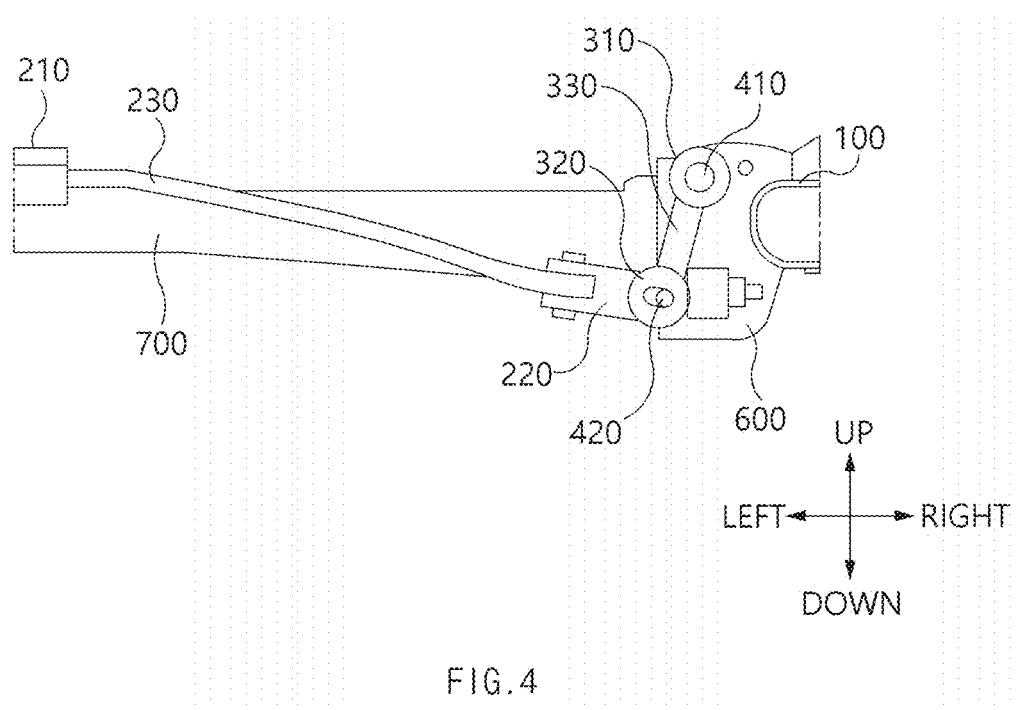
FIG. 4 is a rear view of a suspension for a vehicle according to the first embodiment of the present disclosure.

For example, the shape of the suspension according to the modification of the first embodiment may correspond to the vertically reversed shape of the suspension 10 according to the first embodiment illustrated in FIG. 4.

Again, according to the first embodiment, the shaft 400 may include a first shaft 410 and a second shaft 420. The first shaft 410 may define the first rotation axis X1. The first shaft 410 may be inserted through the first link end 310.

Furthermore, the first shaft 410 may be fixed to the fixed frame 600. For example, the first shaft 410 may be inserted through and fixed to the fixed frame 600. However, the embodiments of the present disclosure are not limited to the example, and the first shaft 410 may not be inserted through the fixed frame 600 but may be connected to and fixed to opposite sides of the fixed frame 600. The first shaft 410 may be fixed to the fixed frame 600 and may be configured to move together with the fixed frame 600. In other words, a direction in which the first rotation axis X1 is oriented may be changed by the movement of the first shaft 410, and the first shaft 410 may be moved to correspond to the movement of the fixed frame 600. The fixed frame 600 may be fixed to the arm part 100, and it may be moved to correspond to the movement of the arm part 100. Accordingly, the first shaft 410 may be rotated about the arm rotation axis Xa.

The second shaft 420 may form the second rotation axis X2. The second shaft 420 may be inserted through the second link end 320. Furthermore, the second shaft 420 may be fixed to the free leaf end 220. For example, the second shaft 420 may be inserted through and fixed to the free leaf end 220. However, the embodiments of the present disclosure are not limited to the example, and the second shaft 420 may not be inserted through the free leaf end 220, and it may be connected to and fixed to opposite sides of the free leaf end 220. The second shaft 420 may be fixed to the free leaf end 220, and it may be configured to be moved together with the free leaf end 220. In other words, a direction in which the second rotation axis X2 is oriented may be determined by the movement of the second shaft 420, and the second shaft 420 may be moved to correspond to the movement of the free leaf end 220.

The first ball joint assembly 501 may connect the fixed frame 600 and the first link end 310. The first ball joint assembly 501 may be inserted through the first link end 310. The first ball joint assembly 501 may include a first bushing 511 and a first ball joint 521.

The first bushing 511 may connect the first ball joint 521 and the first link end 310. The first bushing 511 may be configured to be rotatable about a first joint rotation center that is a rotation center corresponding to a center of the first ball joint 521. The first bushing 511 may be connected to an outer peripheral surface of a central portion of the first ball joint 521 to be rotatable with respect to the first joint rotation center such that a central portion of the first ball joint 521 is seated on an inner peripheral surface of the first bushing 511.

The first joint rotation center may cross the first rotation axis X1. The first joint rotation center may correspond to a center of the first link end 310.

An outer peripheral surface of the first bushing 511 may be fixed to the first link end 310. Accordingly, the first bushing 511 may be configured to be moved together with the first link end 310 while being fixed to the first link end 310. In other words, because the first link end 310 is moved to correspond to the movement of the first bushing 511, the first link end 310 may be rotated about the first rotation axis X1 and may be moved to be inclined in a direction that is different from the first rotation axis X1 with respect to the joint rotation center as well. In other words, the first link end 310, the second link end 320, and the link body 330, which are integrally formed, may be moved to be inclined in a direction that is rotated with the first rotation axis X1 with respect to the first joint rotation center.

The first shaft 410 may be fixed to the first ball joint 521. For example, the first shaft 410 may be inserted through and fixed to the first ball joint 521. However, embodiments of the present disclosure are not limited to the example, and the first shaft 410 may not be inserted through the first ball joint 521, but it may be connected to and fixed to opposite sides of the first ball joint 521.

An outer peripheral surface of a central portion of the first ball joint 521 may have a ball shape, and an outer peripheral surface of a peripheral portion of the first ball joint 521 may have a cylindrical shape. The central portion of the first ball joint 521 may be named a first pillow ball. A through-hole, through which the first shaft 410 may pass, may be formed in an interior of the first ball joint 521, and an inner peripheral surface of the first ball joint 521 that surrounds the through-hole may be attached the outer peripheral surface of the first shaft 410.

The second ball joint assembly 502 may connect the free leaf end 220 and the second link end 320. The second ball joint assembly 502 may be inserted through the second link end 320. The second ball joint assembly 502 may include a second bushing 512 and a second ball joint 522.

The second bushing 512 may connect the second ball joint 522 and the second link end 320. The second bushing 512 may be rotatable about a second joint rotation center that is a rotation center corresponding to the center of the second ball joint 522. For example, the second bushing 512 may be connected to an outer peripheral surface of a central portion of the second ball joint 522 to be rotatable about the second joint rotation center such that the central portion of the second ball joint 522 is seated on the inner peripheral surface of the second bushing 512. The second joint rotation center may cross the second rotation axis X2. The second joint rotation center may correspond to the center of the second link end 320.

The outer peripheral surface of the second bushing 512 may be fixed to the second link end 320. Accordingly, the second bushing 512 may be configured to be moved together with the second link end 320 while being fixed to the second link end 320. In other words, because the second link end 320 is moved to correspond to the movement of the second bushing 512, the second link end 320 is rotated about the second rotation axis X2 and may be moved to be inclined in a direction that is different from the second rotation axis X2 with respect to the joint rotation center as well. In other words, the first link end 310, the second link end 320, and the link body 330 that are integrally formed may be moved to be inclined in a direction that is skewed with the second rotation axis X2 with respect to the second joint rotation center.

The second shaft 420 may be fixed to the second ball joint 522. For example, the second shaft 420 may be inserted through and fixed to the second ball joint 522. However, the embodiments of the present disclosure are not limited to the example, and the second shaft 420 may not be inserted through the second ball joint 522, and it may be connected to and fixed to opposite sides of the second ball joint 522.

An outer peripheral surface of a central portion of the second ball joint 522 may have a ball shape, and an outer peripheral surface of a peripheral portion of the second ball joint 522 may have a cylindrical shape. The central portion of the second ball joint 522 may be named a second pillow ball. A through-hole, through which the second shaft 420 may pass, may be formed in an interior of the second ball joint 522, and the inner peripheral surface of the second ball joint 522 that surrounds the through-hole may be attached to the outer peripheral surface of the second ball joint 522.

The fixed frame 600 may be fixed to the arm part 100. The fixed frame 600 may be connected to a side of the first arm end 110 in the second leftward/rightward direction. The fixed frame 600 may connect the first arm end 110 and the first link end 310. The fixed frame 600 may space the link 300 and the first arm end 110 apart from each other along the leftward/rightward direction. Through the fixed frame 600, the link 300 may be prevented from interfering with the arm part 100 while being moved.

The torsion beam 700 may have a shape of a beam that extends from the center of the arm body 130 in the leftward/rightward direction. The torsion beam 700 may be a member that applies a torsional elastic force for restoring an original shape thereof when being twisted around a torsion axis that passes through the torsion beam 700 and extends in the leftward/rightward direction. The torsion beam 700 may be located between the first arm end 110 and the second arm end 120 with respect to the forward/rearward direction.

Hereinafter, states of the link 300 that is changed while the suspension 10 for a vehicle is operated will be described in detail with further reference to FIGS. 3 to 6.

Figure 3:
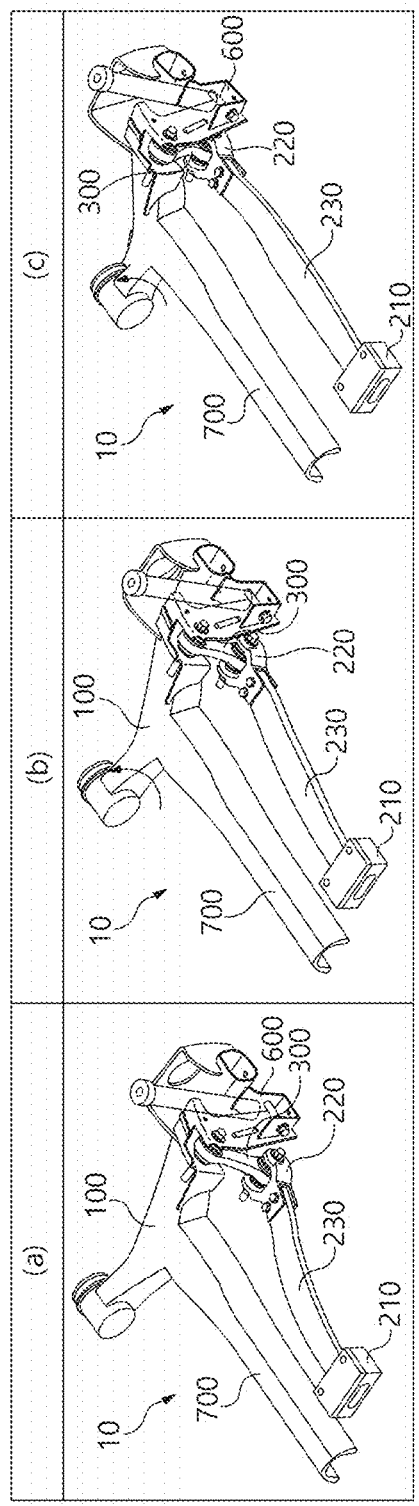
FIG. 3 is a view illustrating separate perspective views of a suspension for a vehicle in three different states, respectively, according to the first embodiment of the present disclosure.
Figure 5:
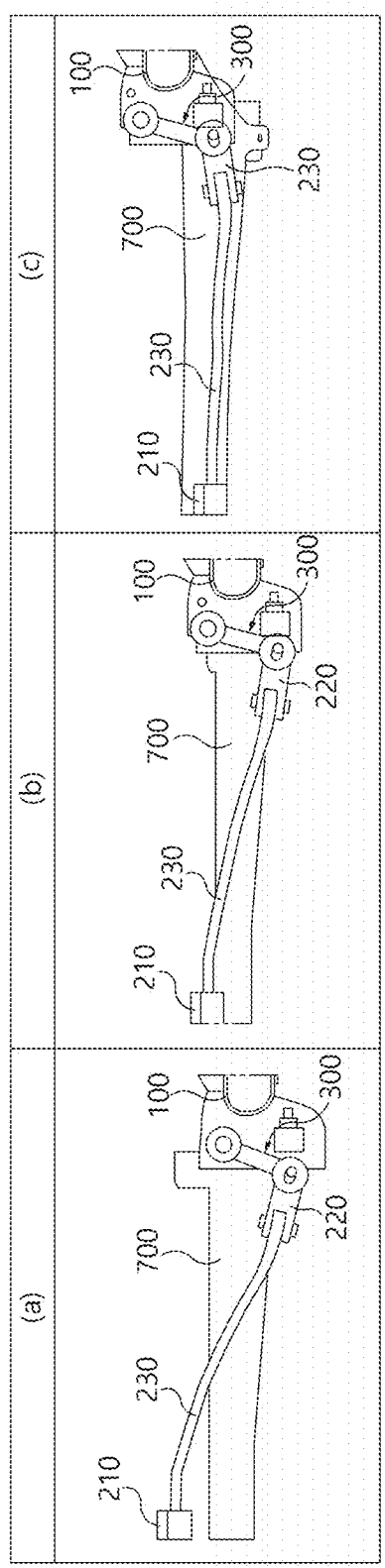
FIG. 5 is a view illustrating separate rear views of a suspension for a vehicle in three different states, respectively, according to the first embodiment of the present disclosure.
Figure 6:
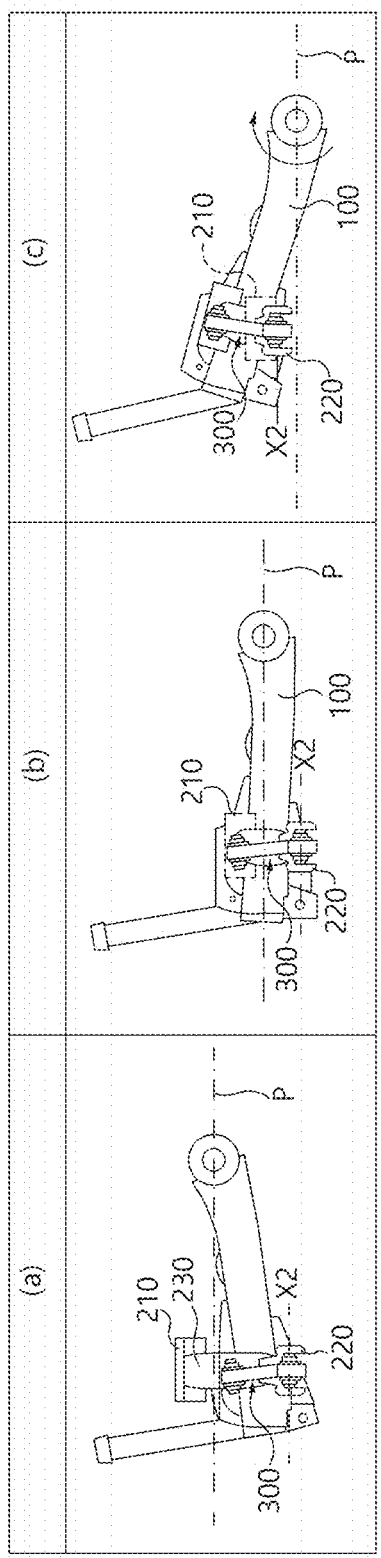
FIG. 6 is a view illustrating separate side views of a suspension for a vehicle in three different states, respectively, according to the first embodiment of the present disclosure.

FIG. 3 is a view illustrating separate perspective views of the suspension for a vehicle in three different states, respectively, according to the first embodiment of the present disclosure, FIG. 4 is a rear view of the suspension for a vehicle according to the first embodiment of the present disclosure, FIG. 5 is a view illustrating separate rear views of the suspension for a vehicle in three different states, respectively, according to the first embodiment of the present disclosure, and FIG. 6 is a view illustrating separate side views of the suspension for a vehicle in three different states, respectively, according to the first embodiment of the present disclosure.

The link 300 may be in any one of a rebound state, a unloaden state, and a bump state. Blocks (a) of FIG. 3, FIG. 5, and FIG. 6 are views illustrating states of the link 300 in the rebound state.

Referring to block (a) of FIG. 6, when the link 300 is in the rebound state, the link body 330 (see FIG. 1) may be located to be spaced downward from a reference plane "P" to be most distant therefrom. The reference plane "P" may mean a plane that passes through the arm rotation axis Xa and is perpendicular to the upward/downward direction. When the link 300 is in the rebound state, the axle may be positioned in a state in which it is moved most downward with respect to the vehicle body. When the link 300 is in the rebound state, the link body 330 may be oriented to be inclined with respect to the upward/downward direction such that an upper portion thereof is located on a rear side of a lower portion thereof.

FIG. 4 and blocks (b) of FIG. 3, FIG. 5, and FIG. 6 are views illustrating states of the link 300 in the unloaden state. The link 300 in the unloaden state may mean a state of the link 300 when a vehicle without any driver or luggage is located on a flat ground without an inclination.

Referring to block (b) of FIG. 6, when the link 300 is positioned in the unloaden state, the link body 330 may be located to cross the reference plane "P." When the first arm end 110 is revolved forward and downward about the arm rotation axis Xa from when the link 300 is in the unloaden state, the link 300 may be switched from the unloaden state to the rebound state.

Blocks (c) of FIG. 3, FIG. 5, and FIG. 6 are views illustrating states of the link 300 in the bumped state. Referring to block (c) of FIG. 6, when the link 300 is positioned in the bump state, the link body 330 may be located to be spaced upward apart from the reference plane "P" to be most distant therefrom. When the link 300 is in the bump state, the axle may be positioned in a state in which it is moved more upward with respect to the vehicle body.

Furthermore, when the first arm end 110 is rotated forward and upward about the arm rotation axis Xa from when the link 300 is in the unloaden state, the link 300 may be switched from the unloaden state to the bump state. When the link 300 is positioned in the bump state, the link body 330 may be oriented to be inclined with respect to the upward/downward direction such that an upper portion thereof is located on a front side of a lower portion thereof.

When the link 300 is switched from any one of the unloaden state, the rebound state, and the bump state to another state, an angle formed by the first rotation axis X1 and the second rotation axis X2 may be changed. For example, when the link 300 switches from any one of the unloaden state, the rebound state, and the bump state to another state, a direction in which the second rotation axis X2 extends may be parallel to one predetermined direction, and an orientation of the first rotation axis X1 may be changed depending on a change in the state of the link 300.

According to the suspension 10 according to the first embodiment of the present disclosure, through the link 300, the first ball joint assembly 501, and the second ball joint assembly 502, a difference value between an arm path that is a path in which the first arm end 110 is rotated about the arm rotation axis Xa and a spring path that is a path in which the free leaf end 220 is moved with respect to the fixed leaf end 210 can be compensated. In other words, even when the arm path and spring path are configured differently, through the link 300, the first ball joint assembly 501, and the second ball joint assembly 502, a decrease in a durability of the suspension 10 due to a relative movement of the first arm end 110 and the free leaf end 220 may be effectively prevented.

Second Embodiment

Hereinafter, a suspension 10a for a vehicle according to the second embodiment of the present disclosure will be described with reference to FIGS. 7 to 10. In a description of the suspension 10a according to the second embodiment of the present disclosure, differences from the first embodiment of the present disclosure will be mainly described.

Figure 7:
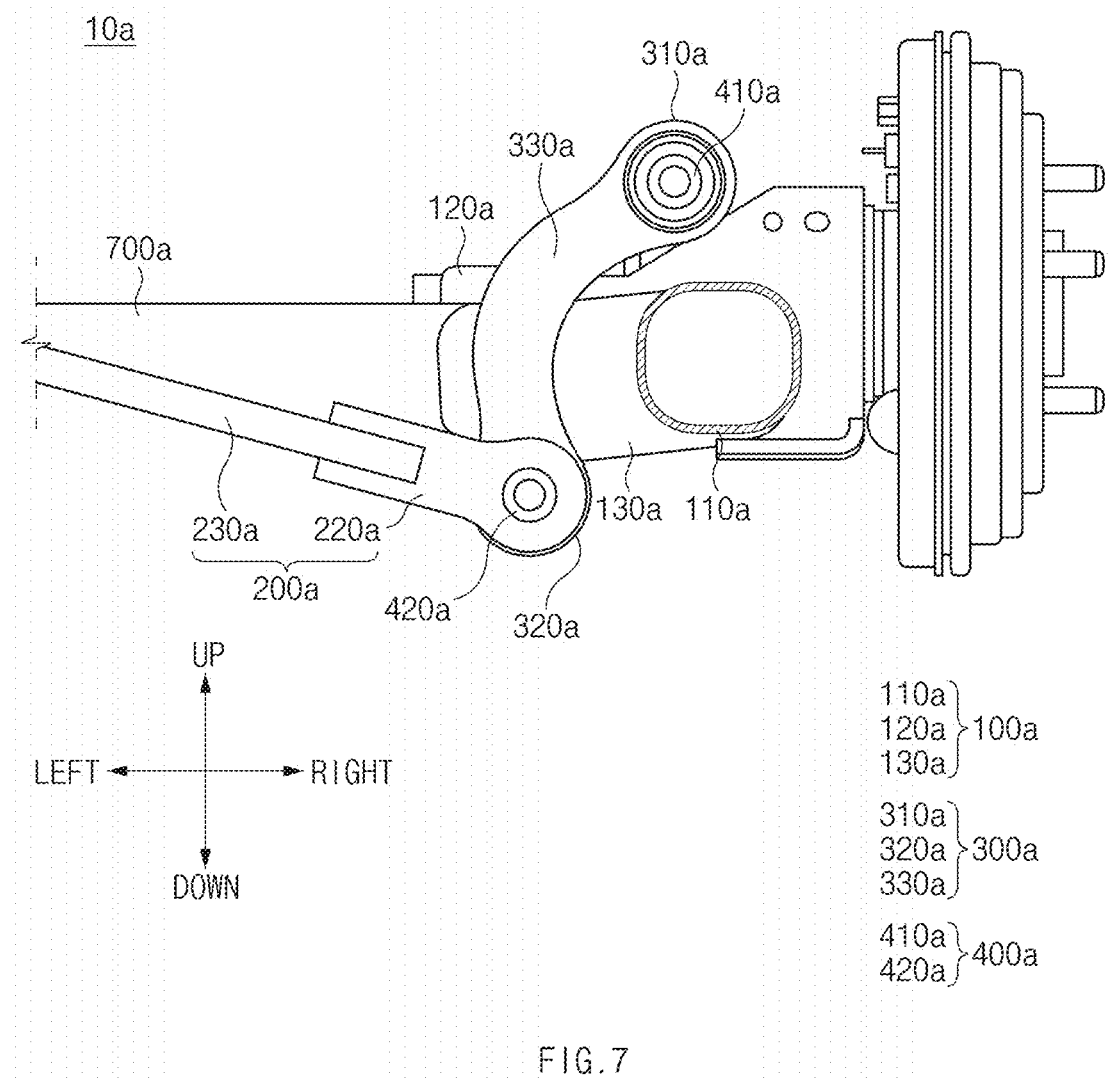
FIG. 7 is a rear view of a suspension for a vehicle according to a second embodiment of the present disclosure.
Figure 8:
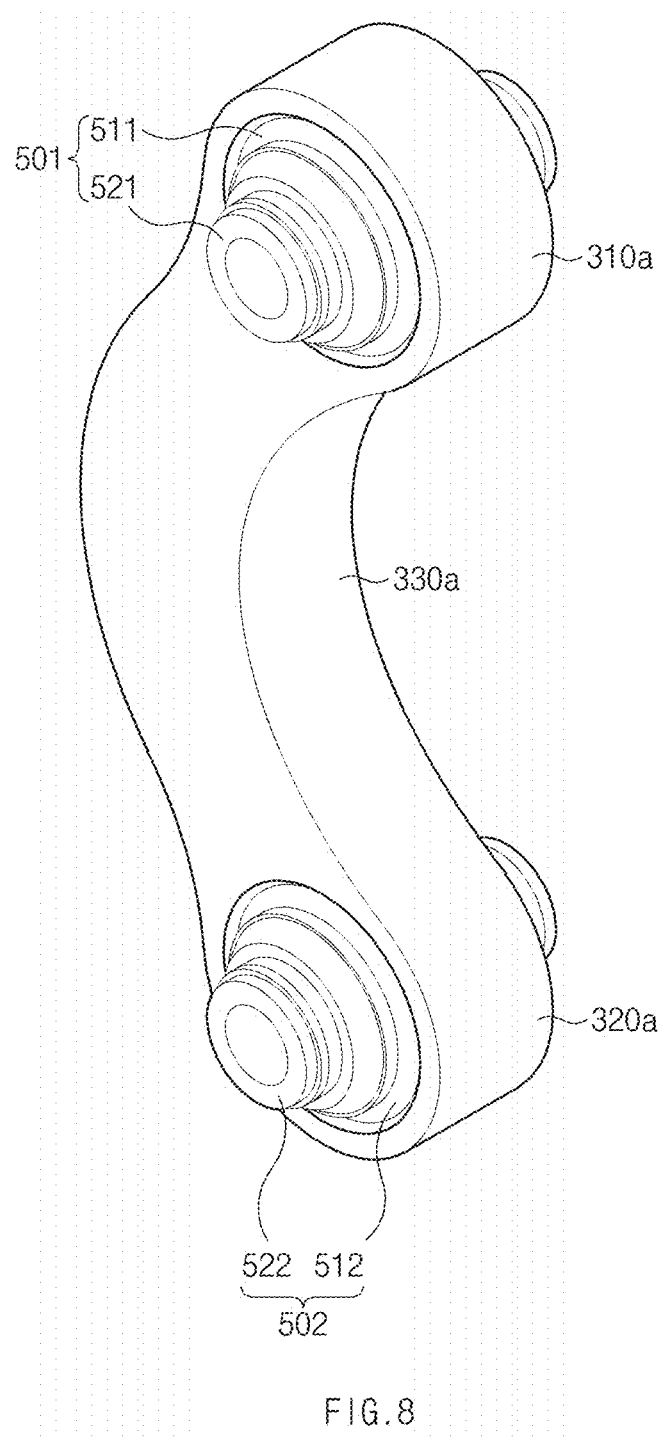
FIG. 8 is a view illustrating a state in which a first ball joint assembly and a second ball joint assembly are connected to a link according to the second embodiment of the present disclosure.
Figure 9:
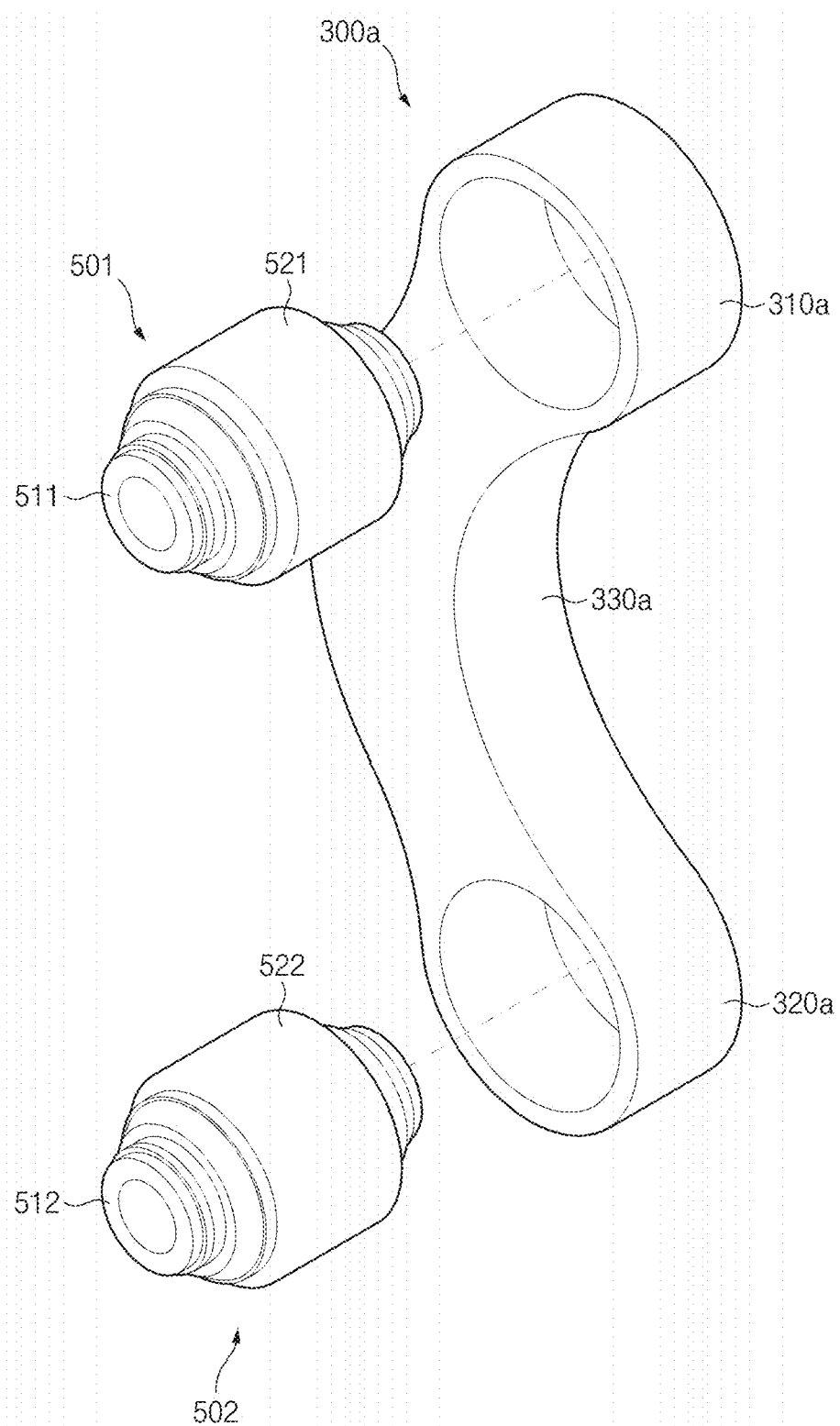
FIG. 9 is a view illustrating a state in which the first ball joint assembly and the second ball joint assembly are separated from the link according to the second embodiment of the present disclosure.
Figure 10:
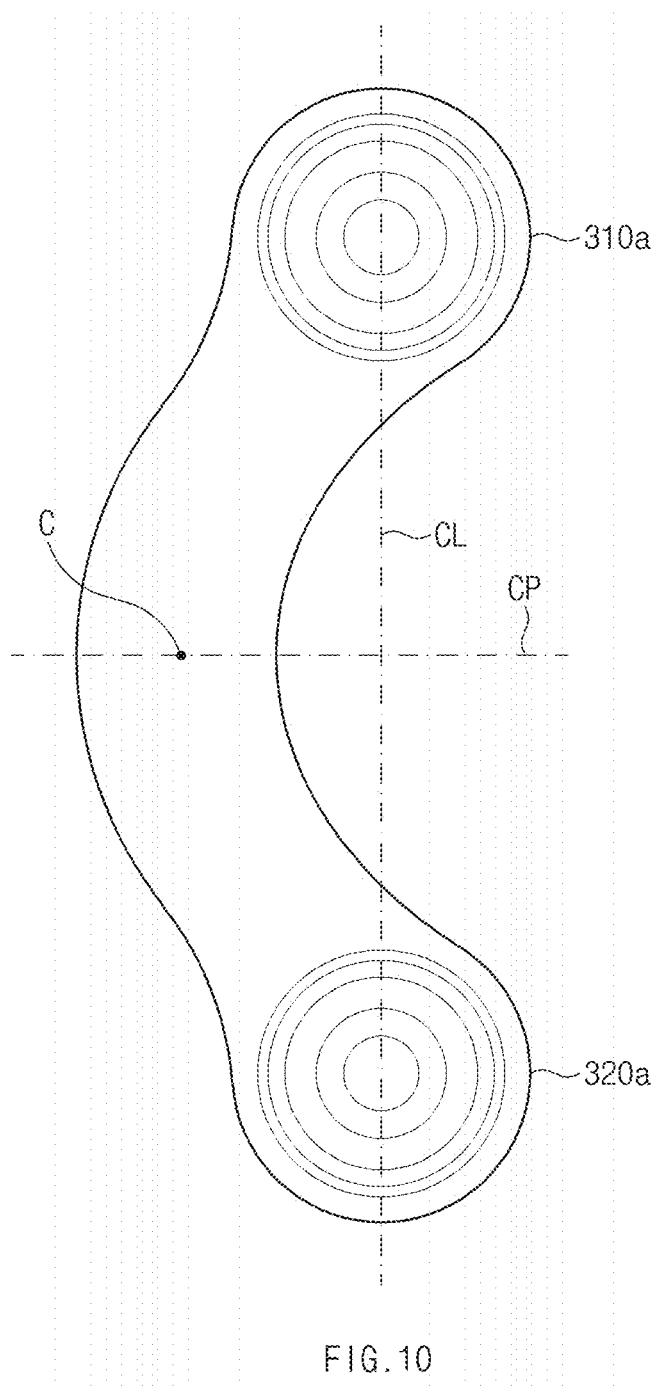
FIG. 10 is a rear view of the link, the first ball joint assembly, and the second ball joint assembly according to the second embodiment of the present disclosure.

FIG. 7 is a rear view of a suspension for a vehicle according to the second embodiment of the present disclosure, FIG. 8 is a view illustrating a state in which a first ball joint assembly and a second ball joint assembly are connected to a link according to the second embodiment of the present disclosure, FIG. 9 is a view illustrating a state in which the first ball joint assembly and the second ball joint assembly are separated from the link according to the second embodiment of the present disclosure, and FIG. 10 is a rear view of the link, the first ball joint assembly, and the second ball joint assembly according to the second embodiment of the present disclosure.

Referring to FIG. 7, the suspension 10a according to the second embodiment of the present disclosure may include an arm part 100a, a transverse leaf spring unit 200a, a link 300a, a shaft 400a, a first ball joint assembly 501, a second ball joint assembly 502, a fixed frame (not illustrated), and a torsion beam 700a.

The arm part 100a may include a first arm end 110a, a second arm end 120a, and an arm body 130a. For a description of the arm part 100a, the first arm end 110a, and the second arm end 120a according to the second embodiment of the present disclosure, the description of the arm part 100, the first arm end 11o, and the second arm end 120 according to the first embodiment of the present disclosure will be used.

The arm body 130a may extend between the first arm end 110a and the second arm end 120a along the forward/rearward direction. The arm body 130a may be configured to be revolved about the arm rotation axis Xa. For example, the arm body 130a and the first arm end 110a may be configured to be revolved together about the arm rotation axis Xa.

The transverse leaf spring unit 200a may include a fixed leaf end, a free leaf end 220a, and a transverse leaf spring 230a. For a description of the transverse leaf spring unit 200a, the fixed leaf end, the free leaf end 220a, and the transverse leaf spring 230a according to the second embodiment of the present disclosure, the descriptions of the transverse leaf spring unit 200, the fixed leaf end 210, the free leaf end 220, and the transverse leaf spring 230 according to the first embodiment of the present disclosure will be used.

Referring to FIGS. 8 and 9, the link 300a may include a first link end 310a, a second link end 320a, and a link body 330a. The first link end 310a may be connected to the arm part 100a to be rotatable. For example, the first link end 310a and the arm part 100a may be connected to each other by a fixed frame.

The first link end 310a may be disposed on an upper side of the arm part 100a. A center of the first link end 310a may be located inside the arm body 130a when the link 300a is viewed downward from an upper side of the link 300a. For example, when the first link end 310a and the arm body 130a are projected with respect to each other along the upward/downward direction, the center of the first link end 310a may overlap a portion of the arm body 130a. In other words, at least a portion of the first link end 310a and at least a portion of the arm body 130a may be disposed to face each other in the upward/downward direction.

The link body 330a may be disposed to be spaced apart from the arm body 130a. For example, when the link 300a is viewed forward from a rear side of the link 300a, the link body 330a may be spaced apart from the arm body 130a in a direction in which the free leaf end 220a faces the fixed leaf end. In this way, because the link body 330a is disposed to be spaced apart from the arm body 130a, the link 300a may be prevented from interfering with the arm body 130a while the arm part 100a is moved.

Referring to FIG. 10, a straight line that passes through a center of the first link end 310a and a center of the second link end 320a may be named a reference line CL. Furthermore, a center of the link body may be named a body center "C" with respect to a direction in which the link body extends.

The link body 330a may have a shape in which the body center "C" is located on a side of the first leaf direction in the reference line. In other words, the link body 330a may have a shape that is disposed to be biased toward the first leaf direction with respect to the first link end 310a and the second link end 320a. A side of the link body 330a in the second leaf direction (an opposite direction to the first leaf direction) may include a recessed area.

The recessed area may have a shape that is recessed in the first leaf direction with respect to the first link end 310a and the second link end 320a. For example, the recessed area may have a shape that is concavely curved in the first leaf direction. An end of the recessed area in the first leaf direction side may be located on a side of the reference line CL in the first leaf direction. In other words, the end of the recessed area in the first leaf direction may be spaced apart from the reference line CL in a direction that is parallel to the first leaf direction.

Furthermore, the link 300 may have a shape that passes through the body center "C" and is symmetrical with respect to a link reference plane CP that is perpendicular to the reference line CL. Furthermore, the link 300 may have a shape that passes through the body center "C" and is symmetrical with respect to an imaginary plane that is perpendicular to the forward/rearward directions.

Through the shape of the link 300a according to the second embodiment of the present disclosure as described above, even when the first link end 310a is disposed adjacent to an upper portion of the arm body 130a, the link 300a and the arm body 130a may be prevented from interfering with each other. Furthermore, because the first link end 310a is not spaced apart from the arm body 130a in the leftward/rightward direction but is disposed close to the arm body 130a with respect to the leftward/rightward direction, a width of the interior space of the vehicle body may be maximally secured.

Meanwhile, the arm part, the transverse leaf spring unit, and the link according to a modification of the second embodiment of the present disclosure may be configured differently from the arm part 100a, the transverse leaf spring unit 200a, and the link 300a according to the second embodiment.

According to the modification of the second embodiment, the first link end may be disposed on a lower side of the second link end. For example, the second link end according to the modification of the second embodiment may be disposed on a lower side of the free leaf end. Accordingly, an upper end of the free leaf end may be disposed on an upper side of the fixed leaf end.

In summary, the arm part, the transverse leaf spring unit, the first link end, and the second link end according to the modification of the second embodiment may be configured to correspond to the shape obtained by vertically reversing the arm part 100a, the transverse leaf spring unit 200a, and the first link end 310a and the second link end 320a, respectively.

For example, the shape of the suspension according to the modification of the second embodiment may correspond to the vertically reversed shape of the suspension 10a according to the second embodiment illustrated in FIG. 7.

The shaft 400a may include a first shaft 410a and a second shaft 420a. The first shaft 410a may be fixed to the arm body 130a. For example, the first shaft 410a may be directly connected to and fixed to the arm body 130a. However, the embodiments of the present disclosure are not limited to the example, and the first shaft 410a may be indirectly connected to the arm body 130a through another structure (e.g., a damper, a carrier, and the like). The first link end 310a may be rotated about the first rotation axis defined by the first shaft 410a with respect to the arm part 100a.

The second shaft 420a may be fixed to the free leaf end 220a. The second link end 320a may be rotated about the second rotation axis defined by the second shaft 420a with respect to the free leaf end 220a.

The first ball joint assembly 501 may include a first bushing 511 and a first ball joint 521. The first bushing 511 may be configured to be rotatable about the first joint rotation center (a rotation center corresponding to the center of the first ball joint 521).

Furthermore, the first joint rotation center may correspond to the center of the first link end 310a. The first bushing 511 may connect the first link end 310a and the first ball joint 521.

Furthermore, the first shaft 410a may be fixed to the first ball joint 521. For example, the first shaft 410a may be inserted through and fixed to the first ball joint 521. However, the embodiments of the present disclosure are not limited to the example, and the first shaft 410a may not be inserted through the first ball joint 521, but it may be connected to and fixed to opposite sides of the first ball joint 521.

The second ball joint assembly 502 may include a second bushing 512 and a second ball joint 522. The second bushing 512 may be configured to be rotatable about a second joint rotation center (a rotation center corresponding to the center of the second ball joint 522). Furthermore, the second joint rotation center may correspond to the center of the second link end 320a. The second bushing 512 may connect the second link end 320a and the second ball joint 522.

Furthermore, the second shaft 420a may be fixed to the second ball joint 522. For example, the second shaft 420a may be inserted through and fixed to the second ball joint 522. However, the embodiments of the present disclosure are not limited to the example, and the second shaft 420a may not be inserted through the second ball joint 522, but it may be connected to and fixed to opposite sides of the second ball joint 522.

Furthermore, referring to FIG. 8, when no external force is applied to the first ball joint assembly 501 and the second ball joint assembly 502, the first ball joint assembly 501 and the second ball joint assembly 502, as an example, may be oriented in parallel to each other. However, the idea of the present disclosure is not limited thereto, and unlike the illustration in the drawing, the first ball joint assembly 501 and the second ball joint assembly 502 may be oriented to be skewed with each other when no external force is applied to the first ball joint assembly 501 and the second ball joint assembly 502.

For a description of the torsion beam 700a according to the second embodiment of the present disclosure, the description of the torsion beam 700 according to the first embodiment of the present disclosure will be used.

According to the suspension for a vehicle according to embodiments of the present disclosure, the height of the floor of the vehicle body may be prevented from being limited by the springs whereby it is possible to lower the height of the floor of the vehicle body.

In addition, the suspension for a vehicle may maximize the durability by minimizing the difference between the behavior of the arm and the behavior of the spring.

Additionally, the suspension for a vehicle may minimize noise generated during an operation thereof.

In the above description, just because all the components constituting the embodiments of the present disclosure are described as being combined or operating in combination, the embodiments of the present disclosure are not necessarily limited to these embodiments. That is, within the scope of the purpose of the present disclosure, all of the components may operate in selective combination of one or more. In addition, terms such as "include," "comprise," or "have" described above mean that the corresponding component may be present, and thus they do not exclude other components unless specifically stated to the contrary, and rather, they should be interpreted as being able to include other components. Unless defined differently, all the terms including technical or scientific terms have the same meanings as those generally understood by an ordinary person in the art to which the present disclosure pertains. The terms, such as the terms defined in dictionaries which are generally used, should be construed to coincide with the context meanings of the related technologies, and they should not be construed as having ideal or excessively formal meanings unless explicitly defined in the present disclosure.

The above description is a simple exemplary description of the technical spirits of the present disclosure, and a person of ordinary skill in the art to which the present disclosure pertains may make various corrections and modifications without departing from the essential characteristics of the present disclosure. Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. A suspension for a vehicle, the suspension comprising:
    an arm part including a first arm end configured to be revolved about an arm rotation axis;
    a transverse leaf spring unit including a fixed leaf end, of which a relative position to the arm rotation axis is fixed, and a free leaf end configured to be moved in a direction crossing the arm rotation axis with respect to the fixed leaf end; and
    a link connecting the arm part and the transverse leaf spring unit;
    wherein the first arm end is configured to be rotated about a first rotation axis with respect to a first link end of the link;
    wherein the free leaf end is configured to be rotated about a second rotation axis with respect to a second link end of the link, the second link end being opposite the first link end; and
    wherein a direction in which a first one of the first rotation axis and the second rotation axis extends varies to be parallel to or cross a direction in which a second one of the first rotation axis and the second rotation axis extends.

2. The suspension of claim 1, wherein the first link end is disposed on an upper side of the free leaf end.

3. The suspension of claim 1, wherein the first link end is disposed on an upper side of the second link end.

4. The suspension of claim 3, wherein, in a case in which a direction in which the fixed leaf end faces the free leaf end in a leftward/rightward direction being parallel to the arm rotation axis is a first leftward/rightward direction, the first link end is disposed on a side of the second link end in the first leftward/rightward direction in a state in which the suspension is viewed from a rear side of the suspension in parallel to a forward/rearward direction.

5. The suspension of claim 1, wherein:
the link comprises a link body extending between the first link end and the second link end; and
the link is configured to be positioned in one of three states, the states comprising:
a unloaden state, in which the link body passes through the arm rotation axis extending in a leftward/rightward direction and crosses a reference plane being perpendicular to an upward/downward direction;
a rebound state, in which the link body is spaced downward apart from the reference plane to be most distant therefrom; and
a bump state, in which the link body is spaced upward apart from the reference plane to be most distant therefrom.

6. The suspension of claim 5, wherein:
the link is configured to be positioned in the rebound state in a case in which the first arm end is revolved about the arm rotation axis toward a front side and a lower side from the unloaden state; and
the link body is oriented to be inclined with respect to the upward/downward direction such that an upper portion of the link body is located on a rear side of a lower portion thereof in a case in which the link is in the rebound state.

7. The suspension of claim 5, wherein:
the link is configured to be positioned in the bump state in a case in which the first arm end is revolved about the arm rotation axis toward a front side and an upper side from the unloaden state; and
the link body is oriented to be inclined with respect to the upward/downward direction such that an upper portion of the link body is located on a front side of a lower portion thereof in a case in which the link is in the bump state.

8. The suspension of claim 5, wherein, in a case in which the link is switched from a first state of the three states to a second state or a third state of the three states, a direction in which the second rotation axis extends is parallel to a predetermined direction, and a direction in which the first rotation axis extends is configured to vary to be parallel to or cross the second rotation axis.

9. The suspension of claim 1, wherein:
the transverse leaf spring unit further comprises a transverse leaf spring extending between the fixed leaf end and the free leaf end;
an elastic force is applied to the transverse leaf spring through revolution of the first arm end; and
the free leaf end is configured to be moved with respect to the fixed leaf end by the elastic force applied to the transverse leaf spring.

10. The suspension of claim 1, wherein an upper end of the fixed leaf end is disposed on an upper side of the free leaf end.

11. The suspension of claim 1, wherein the first link end is disposed on a lower side of the second link end.

12. The suspension of claim 1, wherein the first link end is disposed on a lower side of the free leaf end.

13. The suspension of claim 12, wherein an upper end of the free leaf end is disposed on an upper side of the fixed leaf end.

14. A suspension for a vehicle, the suspension comprising:
an arm part including a first arm end configured to be revolved about an arm rotation axis;
a transverse leaf spring unit including a fixed leaf end, of which a relative position to the arm rotation axis is fixed, and a free leaf end configured to be moved in a direction crossing the arm rotation axis with respect to the fixed leaf end; and
a link connecting the arm part and the transverse leaf spring unit, wherein the first arm end is configured to be rotated about a first rotation axis with respect to a first link end of the link;
a fixed frame coupled to the first arm end and configured to revolve together with the first arm end; and
a first shaft inserted to pass through the first link end to be coupled to the fixed frame and defining the first rotation axis;
wherein the first link end is connected to the fixed frame to be rotatable about the first rotation axis;
wherein the free leaf end is configured to be rotated about a second rotation axis with respect to a second link end of the link, the second link end being opposite the first link end; and
wherein a direction in which a first one of the first rotation axis and the second rotation axis extends varies to be parallel to or cross a direction in which a second one of the first rotation axis and the second rotation axis extends.

15. The suspension of claim 14, further comprising a first ball joint assembly connecting the fixed frame and the first link end and through which the first shaft passes, the first ball joint assembly comprising:
a first ball joint to which the first shaft is coupled; and
a first bushing configured to be rotatable about a first joint rotation center corresponding to a center of the first ball joint and connected to the first link end.

16. The suspension of claim 15, further comprising a second shaft inserted to pass through the second link end to be coupled to the free leaf end and defining the second rotation axis, wherein the second link end is connected to the free leaf end to be rotatable about the second rotation axis.

17. The suspension of claim 16, further comprising a second ball joint assembly connecting the free leaf end and the second link end and through which the second shaft passes, the second ball joint assembly comprising:
a second ball joint to which the second shaft is coupled; and
a second bushing configured to be rotated about a second joint rotation center corresponding to a center of the second ball joint and connected to the second link end.

18. A vehicle comprising:
a vehicle body; and
a suspension for the vehicle mounted on a lower side of the vehicle body, the suspension comprising:
an arm part including a first arm end configured to be revolved about an arm rotation axis;
a transverse leaf spring unit including a fixed leaf end fixed to a lower portion of a vehicle frame and a free leaf end configured to be moved in a direction crossing the arm rotation axis with respect to the fixed leaf end; and
a link connecting the arm part and the transverse leaf spring unit;
wherein the first arm end is configured to be rotated about a first rotation axis with respect to a first link end of the link;
wherein the free leaf end is configured to be rotated about a second rotation axis with respect to a second link end of the link, the second link end being opposite the first link end; and wherein a direction in which a first one of the first rotation axis and the second rotation axis extends varies to be parallel to or cross a direction in which a second one of the first rotation axis and the second rotation axis extends.

19. The vehicle of claim 18, wherein the suspension is disposed on each of two sides of the vehicle in a widthwise direction to have a shape that is symmetrical with respect to a vehicle reference plane passing through a center of the vehicle and being perpendicular to the widthwise direction of the vehicle.

20. The vehicle of claim 18, wherein:

the link comprises a link body extending between the first link end and the second link end; and the link is configured to be positioned in one of three states, the states comprising:

a unloaden state, in which the link body passes through the arm rotation axis extending in a leftward/rightward direction and crosses a reference plane being perpendicular to an upward/downward direction;

a rebound state, in which the link body is spaced downward apart from the reference plane to be most distant therefrom; and a bump state, in which the link body is spaced upward apart from the reference plane to be most distant therefrom.

\* \* \* \* \*